United States Patent Office 2,967,791
Patented Jan. 10, 1961

2,967,791
PROCESS OF COATING ALUMINUM

Roy A. Halversen, Dearborn, Mich., assignor to Parker Rust Proof Company, Detroit, Mich., a corporation of Michigan No Drawing. Filed Aug. 19, 1957, Ser. No. 679,100

16 Claims. (Cl. 148—6.16)

The present invention relates to an improved process of coating aluminum and alloys of aluminum in which aluminum is the principal ingredient with aqueous acidic solutions containing hexavalent chromium and the fluoride ion. These solutions are of the type which are sufficiently acid to chemical react with the aluminum surface to form an adherent coating on the aluminum surface and in the past such solutions have been modified with other ions including the phosphate ion, sulfate ion, chloride ion, nitrate ion, ferricyanide ion, arsenate ion, etc. More particularly, this invention relates to an improved method which permits easier control for continuous operation of such solutions.

It is well known that the acidic attack of an aluminum surface liberates aluminum ions and that such liberated aluminum ions will form a complex ion with the fluoride ion, the particular nature of which complex ion is still in question. It has been recognized that the formation of this complex represents a sludge forming problem, as well as a problem of depletion of the coating-accelerator, the fluoride ion. Because of the depletion of the fluoride ion as a sludge the maintenance of the requisite quantities of fluoride ion in the solution to promote the desired coating has required relatively constant and attentive addition of a fluoride containing replenishing material. Although it has been possible to operate such solutions by adding periodically an excess of the fluoride ion above that which is required to produce the coating so as to offset the sludge forming tendency and the removal of the fluoride ion as an aluminum fluoride complex, this procedure is obviously commercially undesirable.

It is therefore one of the objects of the present invention to provide a process which substantially eliminates the problem of aluminum fluoride complex formation in the continuous operation of an aqueous acidic hexavalent chromium solution containing the floride ion, and the aluminum-fluoride anion.

A further object of this invention is to provide a process which permits the continuous formation of a protective coating on the surface of aluminum from an aqueous acidic hexavalent chromium solution containing the fluoride ion and the aluminum ion by spraying under conventional conditions.

A still further object is to provide a simplified method of controlling the continuous operation of an aqueous acidic hexavalent chromium solution which simultaneously enables the control of the quantity of the complex aluminum fluoride anion, and the $Cr^{+++}$, $Na^+$, $NH_4^+$ and other cations in the processing solution.

Another and important object of this invention is to provide a process which enables the formation on the surface of aluminum of a coating having a uniform green or a uniform gold color.

In the continuous operation of aqueous acidic hexavalent chromium solutions containing the fluoride ion to form coatings on aluminum surfaces, as the aluminum fluoride complex builds up in quantity in the bath with operation, the coatings which are obtained tend to become loose and dusty. It has been conventional to attempt to offset this loose, dusty characteristic by increasing the concentration of both the chromic acid and the fluoride in the operating solution and to determine the required quantity of fluoride by analyzing the solution periodically for total fluoride concentration. Base on this analysis a quantity of fluoride is added which is estimated to provide a quantity of free, or active, fluoride ion in the solution which will continue to cause a coating to be formed. As the aluminum fluoride complex builds up in the solution, however, and even in the presence of added quantities of fluoride, the operation of the solution becomes erratic and the quality of the coatings decreases and is substantially inferior to that which is obtained from a relatively new processing solution which is substantially free from aluminum fluoride complex ions. In operating such a solution by procedures which were conventional prior to the present invention, it has been observed that the chromium content in the coating which is formed tends to decrease as the bath is aged and this is thought to be a partial reason for the decrease in the quality of the coating relative to corrosion resistance or its utility as a paint base.

In accordance with the present invention it has now been recognized that the difficulties encountered in the continuous operation of complex aluminum-fluoride anion containing aqueous acidic hexavalent chromium solutions can be overcome by controlling the source of the trouble, namely, controlling the build-up of the complex aluminum fluoride anion in the solution. The method of this invention comprises the step of removing aluminum from the complex aluminum fluoride anion in the solution and maintaining the concentration of the aluminum as complex aluminum fluoride ion at a level which greatly minimizes the sludge-forming problem in the solution. The method of this invention accomplishes the control of the concentration of the complex aluminum fluoride anion in the solution by the use of a cation exchange resin through which portions of the operating aqueous acidic hexavalent chromium solution containing the fluoride and complex aluminum fluoride anion are passed semicontinuously or continuously, and after having the cations and complex aluminum fluoride anion substantially removed from the solution, the solution is returned to the operating bath.

The aluminum fluoride complex which forms during the continuous operation of the baths of the type with which this invention is concerned is an anion even though all of complexed material may not be in the form of aluminum fluoride $AlF_6^\equiv$. The removal of this undesirable anion complex would normally lead one, who having the concept that it would be desirable to eliminate the aluminum fluoride complex from the solution, to the use of an anion exchange resin.

In accordance with this invention it has been unexpectedly found that the aluminum fluoride complex in the aqueous acidic solutions of this invention is susceptible to dissociation in the presence of a strongly acidic cation exchange resin, and that it is possible to control the concentration of aluminum and metallic cations in such solutions by the use of such a resin. In order to obtain sufficient dissociation of the complex aluminum fluoride anion, it has been found to be important to employ a strongly acidic cation exchange resin and to regulate the acidity of the solution being passed therethrough within certain limits.

The method of this invention operates satisfactorily to easily control and provide continuous operation of an aqueous acidic hexavalent chromium solution containing the fluoride ion as long as the solutions are sufficiently acidic to attack an aluminum surface and by chemical inter-reaction therewith form an integral and adherent coating on the aluminum surface and insufficiently acidic to render the complex aluminum fluoride anion too difficult to dissociate by the use of strongly acidic cation exchange resins, that is, solutions having a free acid in the range of about 3 points to about 170 points, and preferably in the range of 8 to 100 points. The term "points" refers to the number of ml. of N/10 sodium hydroxide required to titrate a 10 ml. sample of the solution to a brom-cresol green endpoint. In such solutions it has been found that in the presence of strongly acidic cation exchange resins sufficient dissociation of the aluminum fluoride anion occurs to enable the maintenance of the aluminum at a desirably low concentration.

The hexavalent chromium ion concentration in the aqueous acidic solutions of this invention can vary satisfactorily over a relatively wide range depending upon the type of aluminum surface being treated, the weight of coating desired and the presence or absence of other ions such as $PO_4$ or arsenate. Broadly stated the hexavalent chromium ion concentration can vary between about 0.07% to about 4% by weight expressed as $CrO_3$. In the absence of the $PO_4$ or arsenate ion, preferred concentrations of $CrO_3$ are in the range of 0.07 to 0.3% by weight. In the presence of $PO_4$ and/or arsenate ions, preferred concentrations of $CrO_3$ are in the range of about 0.7% to about 4% with somewhat more consistent results being obtained when the concentration is maintained within the range of about 1.2% to about 2.6% $CrO_3$. The hexavalent chromium ion may be introduced into the solution as chromic acid or as a dichromate. It is preferred to employ the chromic acid source since any metallic ion which is present in the chromate salt will be removed in the cation exchange resin treatment and the removal of this unnecessary metallic ion will decrease the over-all efficiency of operation of the process. It is therefore preferred to avoid the use of dichromate salts and particularly heavy metal salts, but subject to the above reservation, chromate salts may be used.

As above indicated, the solutions of this invention may include the phosphate ion in addition to the hexavalent chromium and fluoride ions. The presence of the phosphate ion in such solutions has the effect of increasing the rate of coating formation on the aluminum surface and for many purposes its presence is highly desirable. Satisfactory concentrations of the $PO_4$ ion in such solutions lie between about 2% and about 15% by weight expressed as the $PO_4^{--}$ ion. A somewhat better range of concentration to maintain is 3%—8% $PO_4$ ion with the best results having been obtained when the $PO_4$ concentration was about 5%. All or a portion of this quantity of the $PO_4$ ion may be replaced with the arsenate ion and when this replacement is made substantially similar results are obtained, and comparable coatings produced, to those which are obtained from the solutions containing the $PO_4$ ion.

When the chromic acid concentration in the operating solution is maintained within the above given range, satisfactorily adherent and reproducible quality coatings are obtained when the fluoride concentration is maintained within the range of about 0.1% to about 3% by weight. In general the coating weight which is obtained increases as the concentration of the non-complexed fluoride ion in the solution is increased. While satisfactory coatings can be obtained with hexavalent chromium solutions containing the fluoride ion in the complete absence of the aluminum, the method of making such solutions easily continuously operable on aluminum surfaces becomes important as the aluminum dissolved from the metal surface tends to build up in the operating solution. In solutions containing no $PO_4$, arsenate or other modifying ion, the fluoride concentration is preferably maintained between about 0.1% and about 1.0%. In solutions containing the above quantities of chromic acid and fluoride ion satisfactory coatings are obtained until the aluminum concentration reaches about 0.4%. As above stated the maintenance of high quality coatings becomes more difficult as the aluminum concentration increases, and it is therefore preferable to maintain the aluminum concentration between about .005% and about 0.10%.

The fluoride ion may be introduced as hydrofluoric acid, fluoboric acid or fluosilicic acid in proportions sufficient to provide the above stated quantities of the fluoride ion in the solution. While the salts of these acids may be used as the source of the fluoride ion, the acids are preferred for the same reason as that stated in connection with chromic acid. Preferred solutions result when fluoboric acid is employed. The fluoborate ion apparently functions in a buffering capacity to aid in keeping the acidity of the solution at the desired level. The ferricyanide ion can be introduced as the alkali metal salt, particularly the potassium salt, or as the acid but in either event a sufficient quantity should be added to produce a concentration of a ferricyanide ion in the operating solution between about 0.02% and 0.2% by weight.

The cation exchange resins which have been found suitable for the purposes of this invention are generally designated as the strongly acidic cation exchange resins such, for example, as the sytrene-divinylbenzene resins which have been sulfonated with sulfuric acid. Such resins are commercially available from a variety of sources and one such resin which has been found to be completely satisfactory for the purposes of this invention is Dowex 50, which is available from the Dow Chemical Company. A substantially similar resin is available from Rohm & Haas Company under the designation 1R-120 and from the National Aluminate Company under the designation Nalcite HGR. These resins are available in a sodium or hydrogen form and can be used in either form for the purposes of this invention although the hydrogen form is preferred. It is possible to admix the sodium and hydrogen form so as to maintain the desired pH of the operating solution in the resin bed.

For the removal of the aluminum and trivalent chromium ions from the solutions of this invention it is possible to employ cation exchange resins which contain as little as 1% of divinylbenzene and as high as 16% divinylbenzene as the cross-linking agent with styrene and the mesh size of the particles used is not particularly critical. However, for the most practical operation it has been found that resins containing about 4% to 8% of divinylbenzene as the cross-linking agent with styrene and mesh sizes between 20 and 100, most preferably 20–50 mesh size, produce the most efficient degree of metallic ion separation and the fastest flow rates so that the use of the resins in this form is preferred.

The method of this invention comprises the novel step of withdrawing a part of the operating solution of this invention, on a semi-continuous or continuous basis, and passing that solution through the ion exchange bed and returning the effluent to the operating solution so as to maintain the complex aluminum fluoride ion concentration within the above given limits. For certain operations, batch removal and feeding through the ion exchange bed is more advantageous than the continuous cycling of a portion of the solution through the ion exchange bed. In large scale continuous operations, it is most effective to continuously withdraw a portion of the operating solution, pass it through an ion exchange bed and continuously return the ion exchange bed effluent to the operating solution. In either event, the quantity of operating solution to be so processed is that amount which keeps the aluminum concentration in the operating bath within the above given limits. Typical quantities to be so processed for both batch and continuous processing are illustrated in the specific examples. It is desirable to employ a plurality of ion exchange beds to best accommodate either system of operation so that one bed can be employed while the alternate bed is being regenerated by conventional means. In the continuous bed method of operation, suitable piping should be provided to enable switching of the flow from one bed to the other when periodic analysis of the effluent for positive ions indicates that the ion exchange resin needs regeneration.

One of the unexpected advantages which accrues from the use of the method of this invention is that the heretofore conventional variation in color of the coatings obtained as the compositions are continuously used is substantially eliminated and the color obtained is sufficiently uniform so that it functions satisfactorily as a final finish when covered with a clear siccative finish. The coatings resulting from the solutions of this invention which contain no phosphate or arsenate are characteristically golden to brown. Heretofore, coatings produced from solutions having comparable compositions at the start of use have varied in color from golden to light yellow to no color as the aluminum fluoride complex concentration increases. By simply controlling the aluminum concentration below the above stated maximum limits and maintaining the fluoride at substantially the starting concentration, it is relatively easy to continuously produce coatings having substantially no color variation.

The use of the ion exchange resin bed method of controlling the quantity of aluminum in the operating solution has the additional advantage that it preserves the fluoride ingredient in the operating solution because of the return thereof in the effluent from the ion exchange resin bed. Thus a substantial reduction in the quantity of fluoride required to form the coating is obtained with continued use. Moreover the replenishing material which is satisfactory for continuous operation contains substantially reduced proportions of fluoride relative to that which has been employed in replenishing solutions for such operating solutions heretofore. The reduction in the fluoride required is substantial, for example 20% to 50%. A satisfactory replenishing material for use with the solutions of this invention containing no $PO_4$ or other modifying ions is a concentrated aqueous solution of the following analysis:

| | Percent by weight |
|---|---|
| $CrO_3$ | 5–6 |
| HF | 4–8 |
| Balance water. | |

For operating the preferred forms including $H_3BO_3$ the replenishing material should also contain 2%–5% $H_3BO_3$. For those solutions containing the ferricyanide ion the proper concentration is maintained by adding an alkali metal ferricyanide in a proportion to maintain the operating concentration in a range of about .02%–0.2% by weight. A satisfactory replenishing material for solutions of this invention containing the $PO_4$ or arsenate ion is as follows:

| | Percent by weight |
|---|---|
| $CrO_3$ | 15–25 |
| HF | 5–8 |
| $H_3PO_4$ or $As_2O_5$ | 38–48 |
| Balance water. | |

The coatings produced in accordance with the method of this invention are especially useful as a base for vitreous enamel finish coatings. When used for this purpose the conditions of application of the solutions to the aluminum surfaces should be regulated so as to form a relatively light weight coating, preferably in the range of about 10 mg./sq. ft. to about 200 mg./sq.ft. Any of the solutions disclosed herein may be satisfactorily used to produce coatings for use as a base layer for subsequently applied vitreous enamels. The vitreous enamels which are suitable for use are not unique in their composition but should be selected so that their melting point occurs well below the melting point of aluminum and preferably in the range of 975° F.–1075° F. The application of the enamel slips to the coated aluminum surface is preferably accomplished by (1) applying a ground coat of enamel slip, firing the same, cooling the surface, and (2) applying a finish or a cover coat and separately firing it to thereby form the finished article. As an example of a suitable slip for this purpose, the following has been satisfactorily used: 1000 grams of transparent frit, 60 grams of $TiO_2$ and 80 grams of an addition agent containing a mixture of boric acid silicate, and sodium hydroxide was admixed with 336 cc. of water and the mixture ball milled for four hours. After the ball milling was completed the specific gravity of the ground mix was adjusted to 2.2 by the addition of 15 ml. of water. This slip, when applied to an aluminum surface to produce a slip coating weight of 15–20 grams/sq. ft., when fired at 1000° F., covered with a finish coat of 20–25 grams of slip per square foot and fired at 1000° F. produced enamel coated surfaces which were found to be especially adherent and unusually resistant to corrosion and spalling in the presence of unusually corrosive mediums such as 5% aluminum chloride solutions. The coatings were also found to resist flaking or cracking along an edge when the aluminum was cut with a hacksaw, and the cut surface bent at a 90° angle. While somewhat better results have been obtained by employing two coats of vitreous enamel, adherent enamel coatings have been produced by using about 15 to about 25 grams/sq. ft. of enamel slip as the overlayer for the coatings of this invention.

The below given examples illustrate in greater detail typical operating conditions and flow rates for continuously maintaining in operation an aqueous acidic chromic acid solution containing the fluoride ion as aluminum is liberated from the surface of the metal being treated and tends to build up in the solution.

*Example 1*

A 400 gallon processing solution was prepared by admixing 160 pounds of an aqueous concentrate containing 5.4% $CrO_3$, 6.6% HF and 4.5% $H_3BO_3$ with 3½ pounds of potassium ferricyanide which was stirred in with sufficient water to make the 400 gallons to thus produce a solution having the following analysis:

| | Percent by weight |
|---|---|
| $CrO_3$ | 0.21 |
| HF | 0.30 |
| $H_3BO_3$ | 0.24 |
| $K_3Fe(CN)_6$ | 0.1 |

Free acid—7 points.
Balance—water.

Alloy aluminum, 3S and 52S, in strip form was cleaned using an inhibited alkali cleaner, rinsed with water and then treated in the prepared processing solution by spray application at a temperature of 95° F. with the contact time being about 12–23 seconds. Concurrently with the processing of the aluminum strip, 2.3 gallons of processing solution were pumped per minute through a cation exchange resin (Dowex 50). The Dowex 50 resin particle size was 20–100 mesh and was contained in several columns of 4 cubic feet capacity each. Approximately 370,000 square feet of aluminum surface was processed in the solution, as described, over a total time of 56 hours and this quantity of surface treatment required the addition to the operating bath of 492 pounds of a concentrate of composition: 5.4% $CrO_3$, 6.6% HF and 4.5% $H_3BO_3$, and in addition, 7 pounds of potassium ferricyanide.

The aluminum concentration in the operating solution during this run did not exceed 0.08% which was its concentration at the end of the run.

The aluminum strip was rinsed after processing, dried and roller coat painted. The painted strip went into the manufacture of awnings, blinds and house siding, and the quality of the coating and the painted product was in all cases satisfactory. The effluent processing solution from the cation exchange resin was returned to the operating bath. Analysis of the effluent and the processing bath showed that the fluoride content of each was substantially the same. Care was exercised to avoid continuing the use of the ion exchange resin bed after it lost its power to remove the aluminum ion and periodic analysis of the effluent was used to periodically determine the degree of exhaustion of the ion exchange bed. As the efficiency decreased a new bed was employed and the exhausted bed regenerated by conventional techniques, that is, sulfuric acid processing with the regenerating fluids being discarded.

The coatings obtained were adherent, golden to brown in color and corrosion resistant without subsequent additional finish. The color obtained in the coatings during the course of the run were noted to be unusually constant, there being no substantial color change during the entire course of the run.

Example 2

A processing solution of the type containing $PO_4$ ions in addition to fluoride and hexavalent chromium was prepared by admixing chromic acid, phosphoric acid and ammonium bifluoride with sufficient water to provide the following bath analysis: $CrO_3$—1.4%, $H_3PO_4$—5.0%, fluoride ion (total)—0.6%, balance water. The free acid of this solution was determined by titrating a 10 ml. sample thereof to a brom-cresol green endpoint, indicated by a change in color from yellow to dark green, and required 85 ml. of N/10 sodium hydroxide, thus having a free acid of 85 points.

Portions of the above solution were used to treat 3S and 52S aluminum alloy panels by immersion for 4 minutes at 120° F. This treatment produced a coating having a weight of about 300 mg./sq. ft. The fluoride content of another portion of the solution was increased to 0.8% by the addition of $NH_4HF_2$ and an additional quantity of aluminum processed in the solution by immersion for 4 minutes at 120° F. and a coating of about 400 mg./sq. ft. was thereby formed.

Another portion of the solution was increased in fluoride content to a total fluoride of 1.2% and upon treatment of similar aluminum panels for 4 minutes at 120° F. a coating of about 900 mg./sq. ft. was formed. When the time of treatment of this solution containing 1.2% total fluoride was decreased to 90 seconds and sprayed on the panels a coating of about 400 mg./sq. ft. was obtained.

Continuously produced high quality uniformly-green colored coatings having a weight of about 900 mg./sq. ft. were obtained and the aluminum content of the solution maintained below about 0.02% by periodically feeding ½ gallon of the processing solution, out of the 1½ gallons of treating solution, through a Dowex 50 resin bed for each square foot of area of aluminum processed through the treating solution. The resin bed had a volume of ¾ of a gallon. For the continuous formation of 400 mg./sq. ft. coating, a flow rate of about ¼ gallon per square foot of aluminum processed maintained the processing solution at an aluminum concentration less than about 0.02% by weight.

A suitable concentrated aqueous replenishing material for this bath contained 330 grams $CrO_3$ and 870 grams of 75% $H_3PO_4$ per liter of volume and the fluoride content was maintained at the desired level by using a 25% solution of $NH_4HF_2$.

The coating obtained varied in color from light green at the lower coating weights to darker green at the higher coating weights and for each bath were unusually uniform from piece to piece. These coatings were found to be excellent as a base for paint or as a final decorative finish when coated with a clear layer of lacquer.

Additional operating bath compositions which are suitable for the treatment of aluminum surfaces when operated in accordance with the method of this invention are set forth below:

Example 3

| | Percent by weight |
|---|---|
| $CrO_3$ | 0.26 |
| $HBF_4$ | 0.4 |
| $Fe(CN)_6\equiv$ | 0.1 |
| $Cr^{+++}$ | 0.03 |

Free acid—9–10 points.
Balance water.

This bath, when operated at an aluminum content below 0.10, gives a light brown to golden color coating and when the aluminum is less than about .03 gives a weight of about 330 mg./sq. ft. when sprayed on aluminum at 120° F. for a contact time of about 30 seconds. As the aluminum content increases to .06 and .09% the coating weights obtained were respectively 95 and 56 mg./sq. ft.

Example 4

| | Percent by weight |
|---|---|
| $CrO_3$ | 1 |
| $H_3PO_4$ | 4.6 |
| $As_2O_5$ | 0.2 |
| HF | 0.3 |

Balance water.

The coatings obtained from this solution operated at 120° F. by spraying for 30 seconds' contact time, gave coatings comparable to those obtained in Example 2 except they were slightly mottled in appearance.

Example 5

| | Percent by weight |
|---|---|
| $CrO_3$ | 1 |
| $As_2O_5$ | 9.2 |
| HF | 0.6 |

Balance water.

Example 6

| | Percent by weight |
|---|---|
| $CrO_3$ | 1 |
| HF | 0.6 |
| $H_3PO_4$ | 4.8 |
| HCl | 0.6 |

Balance water.

Example 7

| | Percent by weight |
|---|---|
| $CrO_3$ | 1 |
| HF | 0.6 |
| $H_3AsO_4$ (75%) | 1.7 |
| HCl | 2.0 |

Balance water.

Example 8

| | Percent by weight |
|---|---|
| $H_3PO_4$ | 2.2 |
| $H_2SiF_6$ | 2.4 |
| $CrO_3$ | 1.0 |
| HCl | 0.1 |
| $H_2SO_4$ | 0.6 |

Balance water.

Example 9

| | Percent by weight |
|---|---|
| $CrO_3$ | 0.78 |
| $HBF_4$ | 0.9 |
| $Cr^{+++}$ | 0.03 |
| $AlF_6\equiv$ | 0.45 |

Free acid—27–29 points.

Example 10

| | Percent by weight |
|---|---|
| $CrO_3$ | 1.4 |
| $H_3PO_4$ | 5.0 |
| Total F ion | 0.6 |
| Al as $AlF_6\equiv$ | 0.02 |
| $Cr^{+++}$ | 0.03 |

Free acid—85–90 points.

What is claimed is:

1. A method of forming a coating on the surface of aluminum which comprises the steps of contacting the aluminum surface with an aqueous acidic operating solution containing chromic acid, the fluoride ion, and having a free acid of 3-170 points, withdrawing a portion of said operating solution and passing the said portion through a strongly acidic cation exchange resin bed and returning the effluent therefrom to said processing solution, the quantity of said solution passed through said bed being such as to maintain the aluminum concentration in said operating solution in the range of about 0.005% and 0.4% by weight.

2. A method for forming a coating on an aluminum surface which comprises the steps of contacting said aluminum surface with an aqueous acidic operating solution consisting essentially of chromic acid, the fluoride ion and water and having a free acid in the range of 3-170 points, withdrawing a portion of said solution and passing the said withdrawn solution through a strongly acidic cation exchange resin bed and returning the effluent therefrom to said operating solution, the quantity of said withdrawn solution being regulated so as to maintain the concentration of aluminum as complex aluminum fluoride anion in said operating solution in the range of between about 0.005% and 0.4%.

3. A method for treating an aluminum surface which comprises the steps of contacting the said aluminum surface with an aqueous acidic operating solution consisting essentially of chromic acid, the fluoride ion, the ferricyanide ion and water and having a free acid between 3 and 170 points, and as the aluminum concentration in said solution tends to rise above about 0.005% withdrawing a portion of said operating solution and passing said solution through a strongly acidic cation exchange resin bed, returning the effluent from said resin bed to said operating solution, the quantity of said withdrawn solution being selected so as to maintain the concentration of aluminum in said operating solution in the range of 0.005% and 0.4%.

4. A method for treating the surface of aluminum to form a uniformly green coating thereon which comprises the steps of contacting said aluminum surface with an aqueous acidic operating solution consisting essentially of 0.07% to about 4% $CrO_3$, 2% to about 15% of an ion selected from the group consisting of the $PO_4$ ion and the arsenate ion, 0.1% to about 3% of the fluoride ion and water and having a free acid in the range of about 3-170 points, maintaining said surface in contact with said solution until said coating is formed and withdrawing a portion of said operating solution and passing the same through a strongly acidic cation exchange resin bed and returning the effluent therefrom to said operating solution, the quantity of said solution withdrawn being regulated so as to maintain the aluminum concentration in said operating solution in the range of 0.005% to about 0.4%.

5. A method for treating the surface of aluminum to form a uniformly green coating thereon which comprises the steps of contacting said aluminum surface with an aqueous acidic operating solution consisting essentially of 0.07% to about 4% $CrO_3$, 2% to about 15% of the $PO_4$ ion, 0.1% to about 3% of the fluoride ion and water and having a free acid in the range of about 3-170 points, maintaining said surface in contact with said solution until said coating is formed and withdrawing a portion of said operating solution and passing the same through a strongly acidic cation exchange resin bed and returning the effluent therefrom to said operating solution, the quantity of said solution withdrawn being regulated so as to maintain the aluminum concentration in said operating solution in the range of .005% to about 0.4%.

6. A method for treating the surface of aluminum to form a uniformly green coating thereon which comprises the steps of contacting said aluminum surface with an aqueous acidic operating solution consisting essentially of 1.2% to about 2.6% $CrO_3$, 3% to about 8% of the $PO_4$ ion, 0.1% to about 3% of the fluoride ion and water and having a free acid in the range of about 3-170 points, maintaining said surface in contact with said solution until said coating is formed and withdrawing a portion of said operating solution and passing the same through a strongly acidic cation exchange resin bed and returning the effluent therefrom to said operating solution, the quantity of said solution withdrawn being regulated so as to maintain the aluminum concentration in said operating solution in the range of .005% to about 0.10%.

7. A method for treating the surface of aluminum to form a uniformly green coating thereon which comprises the steps of contacting said aluminum surface with an aqueous acidic operating solution consisting essentially of 0.07% to about 4% $CrO_3$, 2% to about 15% of the arsenate ion, 0.1% to about 3% of the fluoride ion and water and having a free acid in the range of about 3-170 points, maintaining said surface in contact with said solution until said coating is formed and withdrawing a portion of said operating solution and passing the same through a strongly acidic cation exchange resin bed and returning the effluent therefrom to said operating solution, the quantity of said solution withdrawn being regulated so as to maintain the aluminum concentration in said operating solution in the range of .005% to about 0.4%.

8. A method for treating an aluminum surface to produce a uniform golden colored coating thereon which comprises the steps of contacting an aluminum surface with an aqueous acidic solution consisting essentially of chromic acid, the fluoride ion, the ferricyanide ion and the fluoborate ion and water and having a free acid in the range of about 3 to 170 points, and while continuously processing aluminum through said solution, withdrawing a portion of said operating solution and passing the said withdrawn portion through a strongly acidic cation exchange resin bed and returning the effluent from said bed to said operating solution, the quantity of solution so withdrawn being regulated so as to maintain the aluminum concentration in said operating solution in the range of about 0.005% to about 0.4%.

9. A method for treating an aluminum surface to produce a uniform golden colored coating thereon which comprises the steps of contacting an aluminum surface with an aqueous acidic solution consisting essentially of the hexavalent chromium ion, the fluoride ion, the ferricyanide ion and the fluoborate ion and having a free acid in the range of about 3 to 170 points, and while continuously processing aluminum through said solution, withdrawing a portion of said operating solution and passing the said withdrawn portion through a strongly acidic cation exchange resin bed and returning the effluent from said bed to said operating solution, the quantity of solution so withdrawn being regulated so as to maintain the aluminum concentration in said operating solution in the range of about .005% to 0.10%.

10. A process in accordance with claim 4 wherein said withdrawn solution is continuously withdrawn and the said effluent is continuously returned to said operating solution.

11. A process in accordance with claim 8 wherein said withdrawn solution is continuously withdrawn and the said effluent is continuously returned to said operating solution.

12. A replenishing material suitable for continuously replenishing an aqueous acidic operating solution containing the hexavalent chromium ion, the fluoride ion and having a free acid in the range of 3-170 points, which consists essentially of a concenerated aqueous solution of 5% to 6% $CrO_3$, 4% to 8% HF and the balance water.

13. A replenishing material suitable for continuously replenishing an aqueous acidic operating solution containing the hexavalent chromium ion, the fluoride ion, and having a free acid in the range of 3–170 points, which consists essentially of, in percent by weight, 5%–6% $CrO_3$, 4%–8% HF, 2% to 5% $H_3BO_3$ and the balance water.

14. A method for forming a vitreous enamel coated aluminum article which comprises the steps of contacting an aluminum surface with an aqueous acidic operating solution containing chromic acid, the fluoride ion, and having a free acid of 3–170 points, maintaining the aluminum concentration in said solution within the range of 0.005% and 0.4% by weight by withdrawing a portion of said operating solution and passing the said portion through a strongly acidic cation exchange resin bed and returning the effluent from said bed to said processing solution, maintaining the said processing solution in contact with said aluminum surface until a coating having a weight in the range of about 10 mg./sq. ft. to about 200 mg./sq. ft. is formed on said surface, applying a vitreous enamel slip to the said coated surface and firing the said slip to thereby form said vitreous enamel coated article.

15. A method for forming a vitreous enamel coated aluminum article which comprises the steps of contacting the surface of said article with an aqueous acidic operating solution consisting essentially of 0.07% to about 4% $CrO_3$, 2% to about 15% of an ion selected from the group consisting of the $PO_4$ ion and the arsenate ion, 0.1% to about 3% of the fluoride ion and water and having a free acid in the range of about 3–170 points, withdrawing a quantity of said operating solution and passing the same through a strongly acidic cation exchange resin bed and returning the effluent from said bed to said operating solution to thereby maintain the aluminum concentration in said operating solution in the range of about 0.005% to about 0.4%, and maintaining contact until a coating having a weight in the range of about 10 mg./sq. ft. to about 200 mg./sq. ft. is formed on said surface, applying about 15 to about 25 grams per square foot of vitreous enamel slip to said surface and thereafter firing said slip.

16. A method for forming a vitreous enamel coated aluminum article which comprises the steps of contacting the surface of said article with an aqueous acidic solution consisting essentially of chromic acid, the fluoride ion, the ferricyanide ion, the fluoborate ion and water and having a free acid in the range of about 3–170 points, withdrawing a portion of said operating solution and passing the said withdrawn portion through a strongly acidic cation exchange resin bed and returning the effluent from said bed to said operating solution, the quantity of solution so withdrawn being regulated so as to maintain the aluminum concentration in said operating solution in the range of about 0.005% to about 0.4%, maintaining the solution in contact with said surface until a coating is formed on said surface having a weight in the range of about 10 mg./sq. ft. to about 200 mg./sq. ft., applying about 15 to about 25 grams of vitreous enamel slip to said coated surface and thereafter firing said slip to thereby produce a vitreous enamel article.

References Cited in the file of this patent

UNITED STATES PATENTS

| | | |
|---|---|---|
| 2,438,877 | Spruance | Mar. 30, 1948 |
| 2,494,909 | Spruance et al. | Jan. 17, 1950 |
| 2,777,785 | Schuster et al. | Jan. 15, 1957 |
| 2,796,370 | Ostrander et al. | June 18, 1957 |
| 2,796,371 | Ostrander | June 18, 1957 |

FOREIGN PATENTS

| | | |
|---|---|---|
| 730,897 | Great Britain | June 1, 1955 |

OTHER REFERENCES

Chem. Eng. October 1954, pages 161–175. Page 171 relied on.